(12) United States Patent  
Gupta et al.

(10) Patent No.: US 9,128,935 B2  
(45) Date of Patent: Sep. 8, 2015

(54) METHOD AND APPARATUS FOR PROVIDING INTEROPERABILITY BETWEEN FLAT AND INTERACTIVE DIGITAL FORMS USING MACHINE-READABLE CODES

(71) Applicant: Adobe Systems Incorporated, San Jose, CA (US)

(72) Inventors: Yash Kumar Gupta, Agra (IN); Rajeev Sharma, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/076,650

(22) Filed: Nov. 11, 2013

(65) Prior Publication Data

US 2015/0129653 A1 May 14, 2015

(51) Int. Cl.  
*G06F 17/00* (2006.01)  
*G06F 17/30* (2006.01)

(52) U.S. Cl.  
CPC ............................... *G06F 17/30011* (2013.01)

(58) Field of Classification Search  
CPC .............. H04L 9/3226; H04L 2209/56; H04L 2209/88; H04L 63/083; H04L 63/12; H04L 9/32; G06F 17/243; G06F 17/248; G06F 19/3462; G06F 21/64; G06F 2221/0737; G06K 19/06037; G06K 2017/0064; G06K 2209/01  
USPC .................. 235/375, 462.01, 472.01, 494  
See application file for complete search history.

(56) References Cited

U.S. PATENT DOCUMENTS

| | | | |
|---|---|---|---|
| 2004/0199778 A1* | 10/2004 | Wernet et al. ................. | 713/189 |
| 2007/0102521 A1* | 5/2007 | Petersson ................... | 235/462.1 |
| 2007/0110235 A1* | 5/2007 | Pruitt et al. ..................... | 380/54 |
| 2008/0130896 A1* | 6/2008 | Wernet et al. ................. | 380/277 |
| 2012/0215669 A1* | 8/2012 | Lieberman et al. ............. | 705/31 |
| 2013/0303189 A1* | 11/2013 | Bennett ....................... | 455/456.2 |
| 2013/0314954 A1* | 11/2013 | Fetterman et al. .............. | 363/44 |
| 2014/0277705 A1* | 9/2014 | Czaja et al. ................... | 700/237 |
| 2014/0298151 A1* | 10/2014 | Fitzpatrick .................... | 715/226 |

* cited by examiner

*Primary Examiner* — Thien M Le  
(74) *Attorney, Agent, or Firm* — Keller Jolley Preece (57) ABSTRACT

A computer implemented method and apparatus for providing interoperability between flat and interactive digital forms using machine-readable codes including accessing an interactive form document, extracting page dimensions for at least one page of the interactive form document, extracting a plurality of form field properties for at least one form field of the interactive form document, and generating a machine-readable code, wherein the machine-readable code comprises the extracted page dimensions and the plurality of form field properties. The method then embeds the machine-readable code into the interactive form document.

20 Claims, 5 Drawing Sheets

METHOD AND APPARATUS FOR PROVIDING INTEROPERABILITY BETWEEN FLAT AND INTERACTIVE DIGITAL FORMS USING MACHINE-READABLE CODES

BACKGROUND

1. Field of the Invention

Embodiments of the present invention generally relate to software interoperability and compatibility and, more particularly, to a method and apparatus for providing interoperability between flat and interactive digital forms using machine-readable codes.

2. Description of the Related Art

Currently, when documents are scanned and digitized, it becomes difficult to accurately detect form fields. The position and types of data for each field (e.g., text, numbers, check boxes) are not readily detectable. As a consequence, the interactive qualities of form fields, such as hints, data checking and feedback to a user, are lost. Accordingly, entering data into such forms after they are scanned provides a poor user experience compared with an interactive dynamic form.

Similarly, there is difficulty in data extraction, especially from forms that have different types of data entry (data filling). Some digital forms are dynamic and have fillable form fields for data entry, other forms are in paper form and need to be scanned, digitized and then filled in, while other are filled in while in paper form and are then scanned and digitized. In all such scenarios, quite often, there is no easy method of determining whether a similar form has been previously filled in, either in paper or digital form. Data migration from one scanned form to another version of the form is also difficult.

Therefore, there is a need for a reliable and accurate method for interoperability between flat and interactive digital forms using machine-readable codes.

SUMMARY

A computer implemented method for providing interoperability between flat and interactive digital forms using machine-readable codes is described. The method accesses an interactive form document. From the interactive form document, the method extracts page dimensions for at least one page of the form document. The method then extracts form field properties for at least one form field. Form field properties may include a position, dimensions, and a type for the at least one form field. A machine-readable code is generated wherein the machine-readable code comprises the extracted page dimensions and form field properties. The method then embeds the machine-readable code into the interactive form document.

In another embodiment, an apparatus for providing interoperability between flat and interactive digital forms using machine-readable codes is described. The apparatus includes a computer having one or more processors in a memory and further comprising a code generator for extracting form data from an interactive form and generating at least one code containing form data, comprising extracted page dimensions of the at least one page and extracted form field properties for the at least one form field. The apparatus also includes a form generator for recreating the interactive form from the at least one generated machine-readable code.

In yet another embodiment, a non-transient computer readable medium for storing computer instructions that, when executed by at least one processor causes the at least one processor to perform a method for providing interoperability between flat and interactive digital forms using machine-readable codes is described. The computer readable medium contains instructions of a method comprising accessing interactive form document, extracting page dimensions for at least one page of the form document, extracting form field properties for at least one form field, and generating a machine-readable code. The machine-readable code comprises the extracted page dimensions and form field properties. The method then embeds the machine-readable code into an interactive digital form.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

While the method and apparatus is described herein by way of example for several embodiments and illustrative drawings, those skilled in the art will recognize that the method and apparatus for providing interoperability between flat and interactive digital forms using machine-readable codes is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method for providing interoperability between scanned and digital forms using QR codes defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method for providing interoperability between flat and interactive digital forms using machine-readable codes. In an exemplary embodiment, the machine-readable code is a quick response (QR) code. However, it is appreciated that embodiments of the present invention may be implemented using any form of machine-readable code. In one embodiment, a machine-readable code is created for each page of a digital document that includes one or more form fields. The machine-readable code may include the page dimensions, and for each form field on the page, indicia of a position and size of the form field. When the digital document is later printed and scanned into a computer, a user is not presented with a flat document with non-interactive fields. Rather, the machine-readable code is decrypted and used to recreate the form fields on each page. Thus, the user is provided an interactive document.

A flat or flattened form as described herein is a resultant file from a scanned physical document in which the fields are not interactive. Interactive forms contain digital aids for the user entering information into the form. Examples may include but are not limited to: text boxes; push-buttons, field specific fonts, hints, pop-up notifications, sounds, color changes for unexpected entries, automatic proofreading, or mouse over events (e.g., calendar appears). Form field properties are data regarding the location of a particular field relative to other fields or the page dimensions as well as the type of data the field carries (e.g., name, calendar, push button choice, and the like). Capturing includes scanning and decoding an image for form field properties. Machine-readable codes are codes used to encode field information of a document. Exemplary embodiments disclosed herein use QR codes as the machine-readable codes. However, other embodiments may use different codes (e.g., bar codes, encrypted images, and the like) for carrying form field properties.

Advantageously, providers of form creation and document decoding software such as ADOBE® Systems Incorporated, may use the present embodiments of the invention as a plug-in or application within mobile devices, tablets, and other electronic devices capable of capturing and decoding machine-readable codes. Such software includes, but is not limited to ADOBE® ACROBAT®, ADOBE® Lifecycle, and ADOBE® FormsCentral. The embodiments generate machine-readable codes for forms, such that, if the forms are later scanned, the forms retain their interactive qualities. In addition, the scanned form may be compared to similar forms that were previously filled by the user and populate common form fields. This improves user experience by providing interactive digital forms that are comfortable to the user.

In some embodiments, scanned documents (e.g., forms) may be organized and compared with known documents using corresponding QR codes. In alternative embodiments, the QR code may be linked to a URL corresponding to a stored digital form. Comparing QR codes effectively compares forms with previous versions of forms and advantageously allows simple updating of form data or form fields. Similarly, using the QR code comparisons, migration of user data may be handled such as to quickly auto-populate (auto-fill) previously entered user data in similar data fields across multiple forms. The methods disclosed herein may generate a QR code for an existing form or a QR code may be simultaneously created when creating a new form.

Various embodiments of a method for providing interoperability between flat and interactive digital forms using machine-readable codes are described. In the following detailed description, numerous specific details are set forth for providing a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
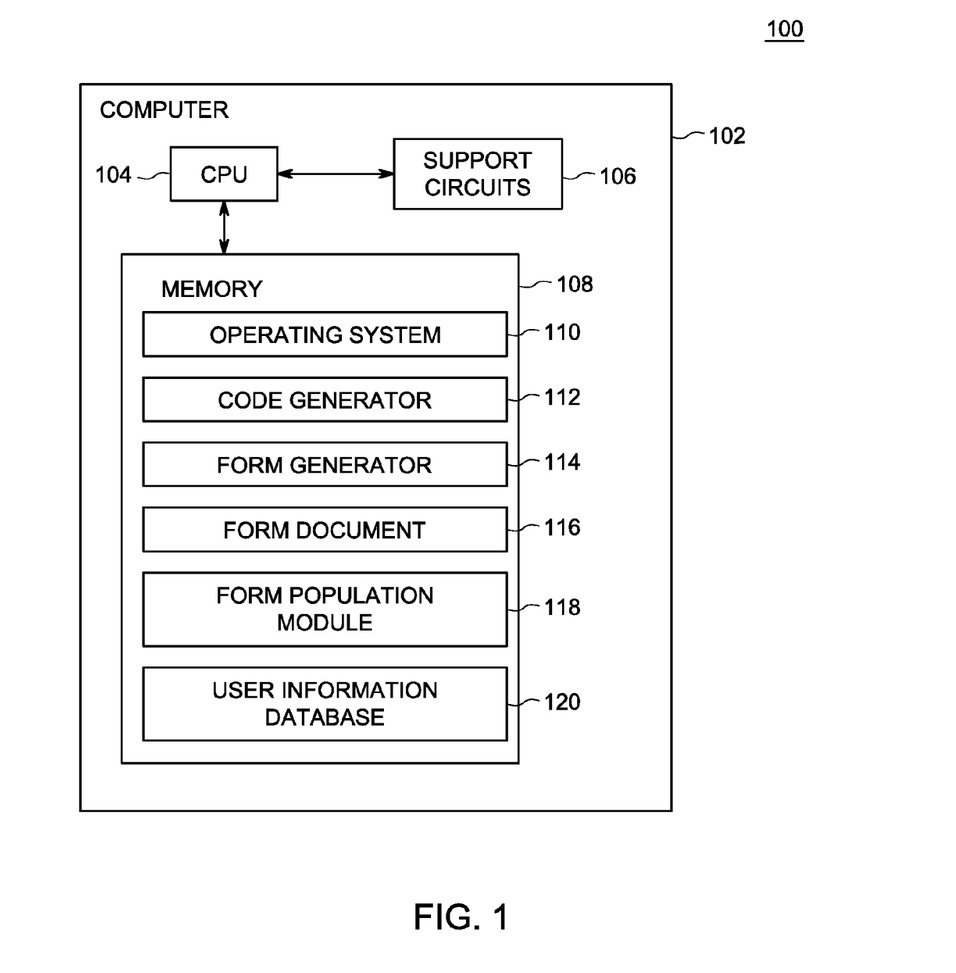
FIG. 1 is a block diagram of an apparatus for providing interoperability between flat and interactive digital forms using machine-readable codes, according to one or more embodiments.

FIG. 1 is a block diagram of an apparatus 100 for providing interoperability between flat and interactive digital forms using machine-readable codes, according to one or more embodiments. The codes are described as an exemplary embodiment using quick response (QR) codes. The apparatus 100 includes a computer 102. The computer 102 is a computing device, for example, a desktop computer, laptop, tablet computer, and the like. The computer 102 includes a Central Processing Unit (CPU) 104, support circuits 106, and a memory 108. The CPU 104 may include one or more commercially available microprocessors or microcontrollers that facilitate data processing and storage. The support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like. The memory 108 includes an operating system 110, a code generator 112, a form generator 114, a form document 116, a form population module 118 and a user information database 120. The operating system 110 may include various commercially known operating systems.

A form document is opened in a document reader, such as ADOBE ACROBAT, ACROBAT READER, Acrobat.com, and the like. A form document is a document that includes interactive form fields. If no QR code exists, the code generator 112 generates a QR code for each page of the form document. For each page of the form document, the code generator 112 determines the dimensions of the page and stores the dimensions in the QR code. The code generator 112 then scans the page for form fields. For each form field, the code generator 112 determines indicia of a position and size of the form field. In one embodiment, the code generator 112 determines the coordinates of a position of a bounding box for each form field and stores the field name and the x,y coordinates for the top left, bottom left, top right, and bottom right corners of the bounding box for the form field in the QR code. In another embodiment, the code generator 112 stores x,y coordinates of a corner of the bounding box plus extents from that point. Finally, the code generator 112 stores a type of form field in the QR code, for example, text, date, number, checkbox, and the like. In some embodiments, the code generator 112 may store hint text, validation logic, and the like. In some embodiments, the code generator 112 embeds the QR code that includes the stored information in the page of the document. In some embodiments, the code generator 112 stores the page information in a file and generates a QR code that includes a universal resource locator (URL) where the information may be retrieved. The code generator 112 then embeds the QR code in the page of the document. The code generator 112 repeats the QR code generation for each page of the document.

When a digital document that includes a QR code is opened with a document reader, for each page of a document the form generator 114 accesses or captures the QR code to determine the original page size and form field details for each form field on the page. The document may have been scanned before it was opened. The scanned page may have a different size than the original page. As such, the form generator 114 determines the ratio of the scanned page size to the original page size. If the page sizes are different, the form generator 114 transforms the position coordinates by multiplying them by the determined ratio and creates the form fields at the transformed position coordinates. The form generator 114 repeats the page creation process for each page in the digital document and saves the document as form document 116.

The form population module 118 accesses the user information database 120 to find other similar forms that a user may have filled in. The form population module 118 compares the QR codes on each page of the form document 116 to QR codes of other documents in order to determine whether the form document is similar to other forms, for example, if this form document 116 is a newer version of an older form document 116 that a user has previously filled. If a similar form is found, the form population module 118 populates the form document 116 with the user's data using the location of matching fields between two or more forms.

For example, the user may open a form document on his desktop. The form population module 118 performs a check for similar documents in his local drive. In this case the present invention is embodied as a plugin or a feature in ACROBAT.

Alternatively, the user may access a document from acrobat.com. The form population module 118 performs a check for similar documents stored in an account of the user with acrobat.com. In this case the present invention is embodied in the form of a hosted service and runs at a server, at a client, or partially at both.

The user may access a document from acrobat.com. The form population module 118 performs a check for similar documents stored in a hard drive. In this case the present invention is embodied in the form of a hosted service that runs at a client.

The user may access a form online. The population module 118 performs a check for similar document on his hard drive. In this case the present invention is embodied in form of a browser plugin or a browser supported document viewer.

The user may then fill in the form document 116. Hence, a paper form with a QR code is always available digitally by interpreting the information in the QR code. In other embodiments, the QR code may be located only on the first page of a document and contain form data or URL information to generate multiple pages of the document.

Figure 2:
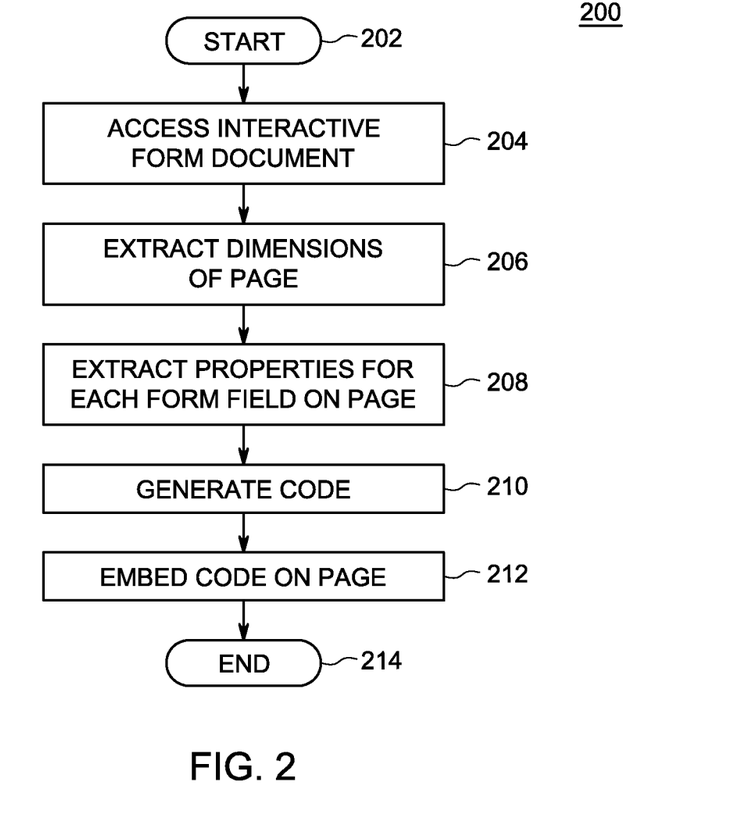
FIG. 2 depicts a flow diagram of a method for creating a QR code for a form, as performed by the code generator of FIG. 1, according to one or more embodiments.

FIG. 2 depicts a flow diagram of a method 200 for creating a QR code for a form, as performed by the code generator 112 of FIG. 1, according to one or more embodiments. The method 200 identifies information about each form field on a page of a form document and stores the information in the QR code. The method 200 then embeds the QR code on the page of the form document. The method 200 is performed for each page of the form document. The method 200 starts at step 202 and proceeds to step 204.

At step 204, the method 200 accesses an interactive form document. An interactive form document is an electronic document that includes form fields, such as a portable document format (PDF) document. The digital form document may include one or more pages. The following steps 206 through 210 are performed on each page of the digital form document.

The method 200 proceeds to step 206, where the method 200 extracts the dimensions of the page. The width and height of the page are stored in the QR code.

The method 200 proceeds to step 208, where the method 200 extracts information for each form field on the page. For each form field, the method 200 determines the position of the form field and identifies indicia for position and size of the form field. In one embodiment, the indicia may be the x,y coordinates of the corners of the bounding box for the form field based on the determined page dimensions. The method 200 stores a name of the form field, a type of the form field and the x,y coordinates of the bounding box for the form field in the QR code. The information may be stored as follows:

{fieldname: "name", type: "text-field", rects: {0: [left, top, right, bottom]}}

{fieldname: "email", type: "text-field", rects: {0: [left, top, right, bottom]}}

{fieldname: "course", type: "checkbox", rects: {0: [left0, top0, right0, bottom0], 1: [left1, top1, right1, bottom1], 2: [left2, top2, right2, bottom2]}}

The "course" field is a checkbox field, with three checkboxes to choose from. As such, the coordinates for the three rectangles are stored, one for each checkbox.

The method 200 proceeds to step 210, where the method 200 generates a QR code. In some embodiments, the QR code includes the page dimensions and form field properties. In some embodiments the information regarding the page dimensions and the form fields is stored in a file and the QR code is generated to include a universal resource locator (URL) of the location of the file.

The method 200 proceeds to step 212, where the method 200 embeds the QR code on the page. When the method 200 is completed, a QR code is embedded in each page of a digital form document.

The method 200 proceeds to step 214 and ends.

Figure 3:
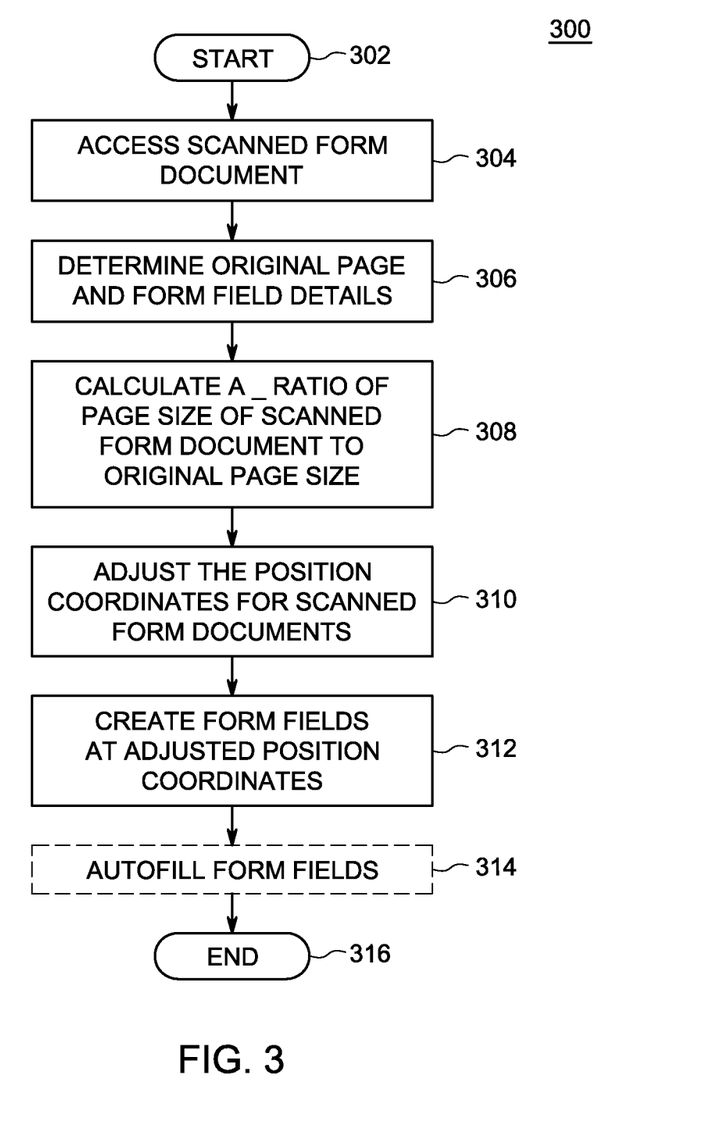
FIG. 3 depicts a flow diagram of a method for generating form fields on a scanned document based on information in a QR code as performed by the form generator of FIG. 1, according to one or more embodiments.

FIG. 3 depicts a flow diagram of a method 300 for generating form fields on a scanned document based on information in a QR code as performed by the form generator 114 of FIG. 1, according to one or more embodiments. When a paper copy of a document is scanned, the interactive qualities of the form fields are lost as a flat form. The method 300 uses the information stored in the QR code to created interactive form fields in the scanned document. The method 300 starts at step 302 and proceeds to step 304.

At step 304, the method 300 accesses a scanned form document. The scanned form document is a form document that includes a QR code that provides details regarding form fields of the form document in its original digital state. However, at some point, the form document may have been printed and later scanned back into a computing device. When the form document is reopened, the form fields are flat (i.e., no longer identifiable nor interactive). The computing device has no indication where the form fields are, based on the scanned document.

The method 300 proceeds to step 306, where the method 300 determines details regarding the original document. For each page of the form document, the method 300 determines page and form field details for the page. The method 300 accesses the QR code on the page. The QR code was created using the method 200 above. The QR code includes the original page size, and form field details for each form field on the page.

The method 300 proceeds to step 308, where the method 300 calculates a ratio of the scanned page size to the original page size. The scanned page may have a difference page size than the original page. When creating form fields on the scanned page, the method 300 must take into consideration the different page sizes when positioning the form fields.

The method 300 proceeds to step 310, where the method 300 adjusts the positions of the form fields for the scanned page. The values of the x and y in the x,y coordinates of the form fields are multiplied by the calculated ratio. This adjustment positions the form fields correctly on the scanned page. If the scanned page size and the original page size are the same, the ratio is 1. In such case, multiplying the x,y coordinates by 1 does not result in any adjustment to the positions of the form fields.

The method 300 proceeds to step 312, where the method 300 creates the form fields at the adjusted position coordinates.

The method 300 optionally proceeds to step 314, where the method 300 attempts to auto-fill one or more of the form fields. Auto-fill is possible from comparing a QR code of another form that has been already filled out by a user. A comparison of the QR codes indicating substantially similar fields allows the system to extract the user entered data for the matching fields. Because the form fields on the scanned form can be recreated with information in the QR code, auto-filling at least one form field based on information stored in the QR code is possible. The method 300 proceeds to step 316 and ends.

Figure 4A:
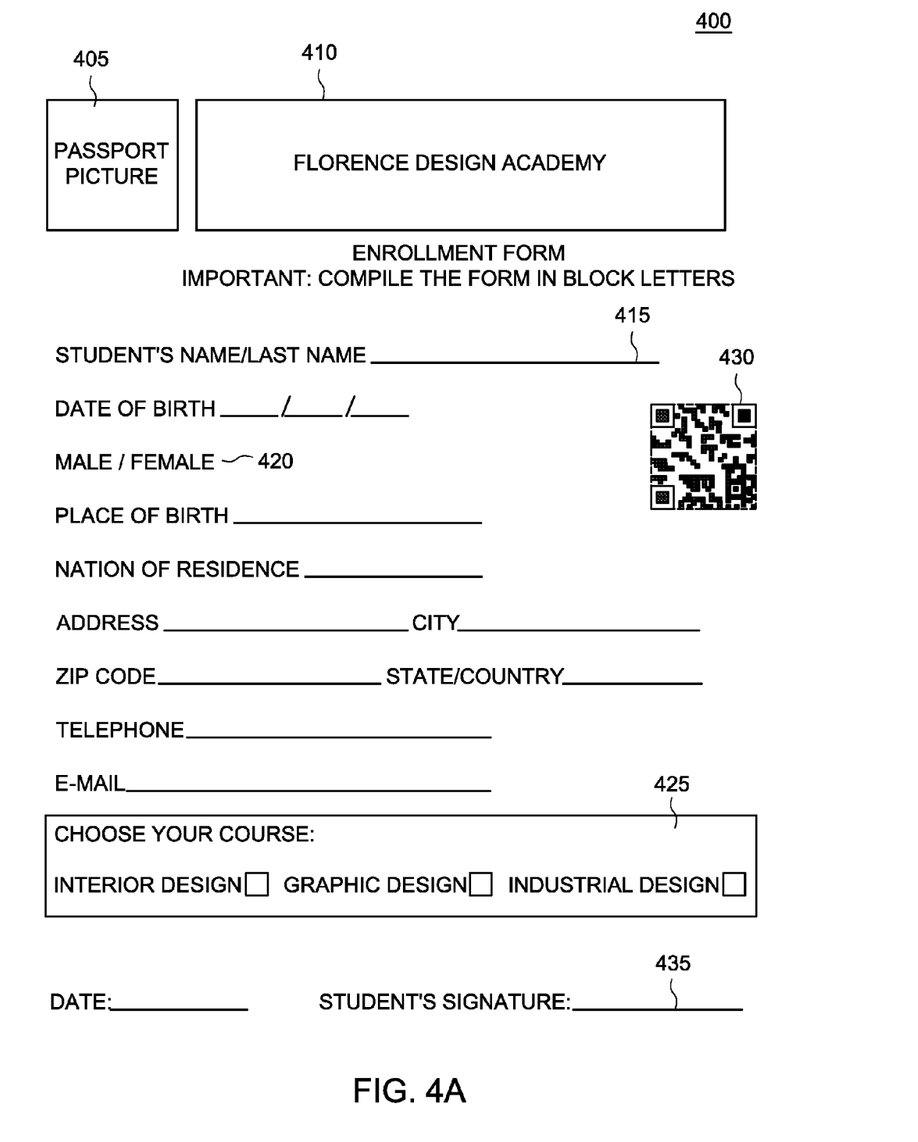
FIGS. 4A and 4B illustrate providing interoperability between scanned and digital forms using quick response (QR) codes, according to one or more embodiments.
Figure 4B:
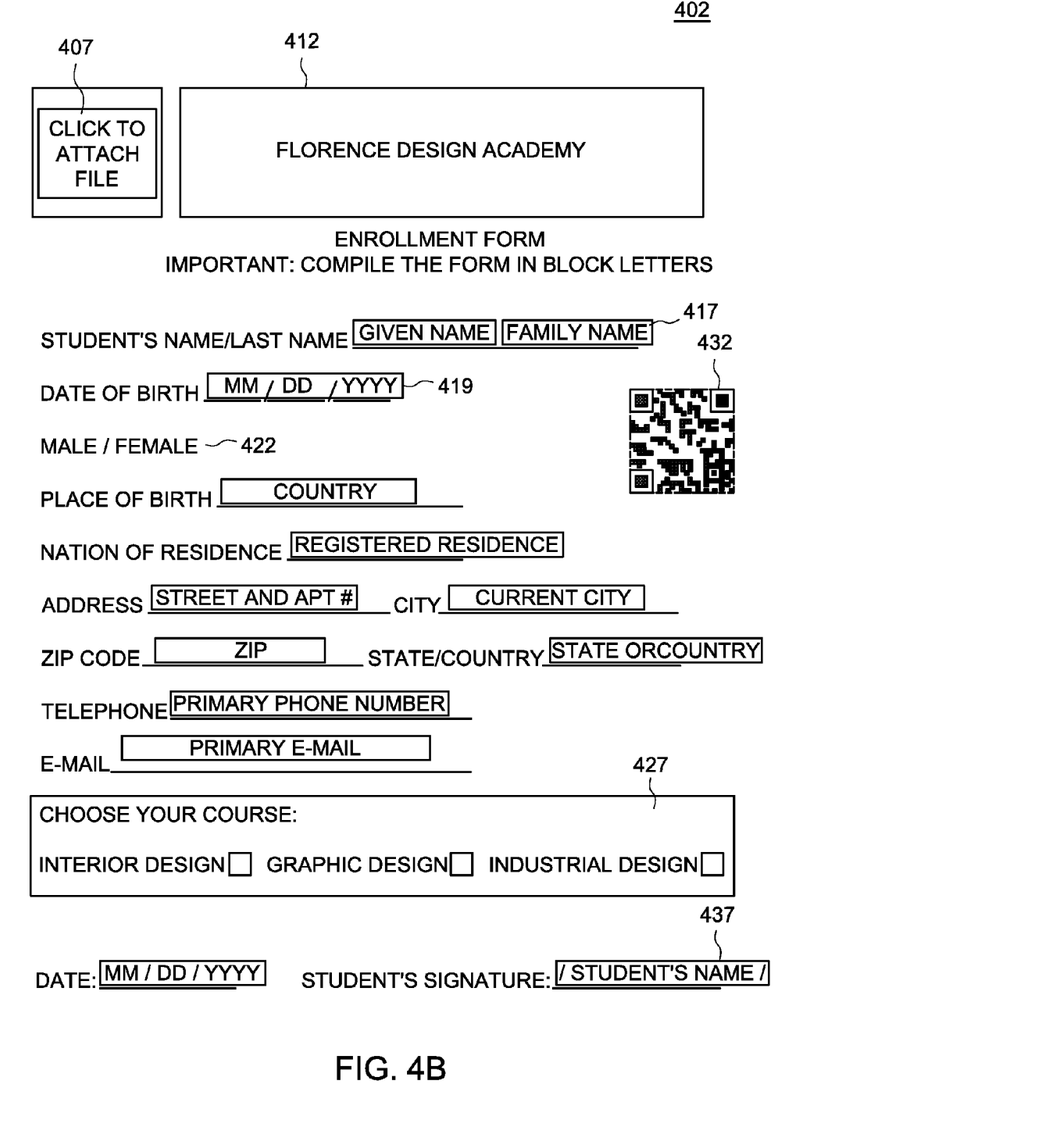

FIGS. 4A and 4B illustrate providing interoperability between scanned and digital forms using quick response (QR) codes, according to one or more embodiments. FIG. 4A is an exemplary illustration of a scanned page 400, according to one or more embodiments. In such an embodiment, the scanned page 400 includes an embedded QR code 430. The exemplary illustration allows a scanned page with a QR code 430 to always be available digitally by interpreting the QR Code 430.

The scanned page 400, includes various fields (405, 415, 429, 425, 435) all requiring user input. Without the QR code 430, the fields 405, 415, 429, 425, and 435 are "flat", meaning they are not identifiable as form fields and are therefore non-interactive. Generally, the scanned page 400 is viewed as a single image for interpretation with a banner logo 410 not distinguished from a user signature 435. Thus, insertion of a passport picture 405 is regarded as the same input as a name 415, a signature 435, or a check box 425. Similarly, despite scanning digitally, items requiring non-uniform input can be difficult to detect even through OCR (optical character recognition). For example, a user may select a male or female choice 420 by circling, highlighting, lining through the undesired choice, underlining the desired choice, and the like.

However, the scanned page 400 has a QR code 430 embedded onto the form that carries data for the scanned page 400 within the QR code 430. Upon interpreting the QR code 430, the scanned page 400 is fully digitized into an interactive digital form 402 as shown in FIG. 4B.

FIG. 4B is an exemplary depiction of a digital page 402, according to one or more embodiments. The digital page 402 is an interactive version of the scanned page 400. The digital page 402 allows a user to attach files 407, click onto images representing external webpage links 412, and have interactive guidance (for fields 417, 419, 422, 427, 437) when filling out the form. Thus, if more than one check box 427 is selected, an error may be returned to the user or the user may be limited to certain forms of input (e.g., must circle 422 to select gender). Similarly, the digital page 402 may be electronically submitted to an offsite server or another electronic device. In such instances, the digital page 402 may prevent submission unless all requisite fields are filled correctly. Correct input may be given as guidance boxes 437 that show an example or instructions as to what belongs in a particular field.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for providing interoperability between flat and interactive digital forms using machine-readable codes comprising:
   accessing an interactive form document;
   extracting, from the interactive form document, page dimensions for at least one page of the interactive form document;
   extracting, from the interactive form document, a plurality of form field properties for at least one form field of the interactive form document, the plurality of form field properties including a position and a size of the at least one form field;
   generating, by at least one processor, a machine-readable code, wherein the machine-readable code comprises the extracted page dimensions and the plurality of form field properties, the machine-readable code allowing for re-creation of the at least one form field in scanned versions of the interactive form document based on the extracted page dimensions and the position and the size of the at least one form field; and
   embedding the machine-readable code into the interactive form document.

2. The method of claim 1, wherein the machine-readable code is a quick response (QR) code.

3. The method of claim 1, wherein the plurality of form field properties further comprise a field name, a field type, and indicia relating the position and the size of the at least one form field relative to the extracted page dimensions of the interactive form document.

4. The method of claim 3, wherein the indicia define a bounding box of the at least one form field.

5. The method of claim 1, further comprising:
   accessing a scanned version of the interactive form document comprising the machine-readable code; and
   re-creating the interactive form document by adding the at least one form field to the scanned version of the interactive form document.

6. The method of claim 5, further comprising:
   auto-filling the at least one form field based on previously entered data from a previously-filled form.

7. The method of claim 5, wherein re-creating the interactive form document further comprises:
   capturing and decoding the machine-readable code;
   determining page and form field properties for the interactive form document from the machine-readable code;
   calculating a ratio of a page size of the scanned version to the interactive form document;
   adjusting a plurality of position coordinates of the at least one form field for the scanned version of the interactive form document based on the calculated ratio; and
   generating the at least one form field at the adjusted position coordinates in the scanned version.

8. A method for providing interoperability between flat and interactive digital forms using machine-readable codes comprising:
   extracting, by at least one processor, form data from an interactive form document;
   generating at least one machine-readable code containing form data, wherein the at least one machine-readable code comprises extracted page dimensions of at least one page and extracted form field properties for at least one form field of the interactive form document; and
   re-creating the interactive form document from the at least one generated machine-readable code.

9. The method of claim 8, further comprising:
   auto-filling the interactive form document based on a location of fields contained in a different form document that has been previously filled.

10. The method of claim 8, wherein the form field properties comprise a field name, a field type, and indicia identifying a position and a size of the at least one form field relative to the extracted page dimensions of the interactive form document.

11. The method of claim 10, wherein the indicia define a bounding box of the at least one form field.

12. The method of claim 8, further comprising: accessing a scanned version of the interactive form document comprising the machine-readable code; and
   re-creating the interactive digital form.

13. The method of claim 12, wherein re-creating the interactive form document comprises:
   capturing and decoding the machine-readable code;
   determining page and form field properties for the interactive form document from the machine-readable code;
   calculating a ratio of a page size of the scanned version to the interactive form document;
   adjusting a plurality of position coordinates of the at least one form field for the scanned version of the interactive form document based on the calculated ratio;
   creating the at least one form field at the adjusted position coordinates; and
   auto-filling the at least one form field based on previously entered data from a previously-filled form.

14. A computer implemented method for creating an interactive digital form from a flat document using machine-readable codes comprising:

accessing a non-interactive version of an interactive form document;

extracting machine-readable code for the interactive form document from the non-interactive version, the machine-readable code comprising page dimensions of the interactive form document and form field properties for at least one interactive form field of the interactive form document; and     modifying, by at least one processor, the non-interactive version of the interactive form document to include the at least one interactive form field using the machine-readable code.

15. The method as recited in claim 14, wherein the form field properties include a position and size of the at least one form field.

16. The method as recited in claim 15, further comprising:

determining page dimensions of the non-interactive version of the interactive form document; and     comparing the page dimensions of the non-interactive version to the page dimensions from the extracted machine-readable code.

17. The method as recited in claim 16, further comprising:

calculating position coordinates for the at least one form field in the non-interactive version of the interactive form document based on:

the comparison of the page dimensions of the non-interactive version of the interactive form document to the page dimensions from the machine-readable code; and         the position and the size of the at least one form field from the machine-readable code; and     generating the at least one form field in the non-interactive version of the interactive form document at the calculated position coordinates.

18. The method as recited in claim 14, further comprising auto-filling the at least one form field based on previously entered data from a previously-filled form.

19. The method as recited in claim 14, wherein accessing the non-interactive version of the interactive form document comprises scanning a print-out of the interactive form document.

20. The method as recited in claim 14, wherein extracting machine-readable code for the interactive form document from the non-interactive version comprises reading a quick response (QR) code on the non-interactive version.

\* \* \* \* \*